UNITED STATES PATENT OFFICE.

FREDERICK W. FRERICHS, OF ST. LOUIS, MISSOURI.

PROCESS OF PRODUCING CALCIUM PYROPHOSPHATE AND AMMONIA.

1,002,198. Specification of Letters Patent. Patented Aug. 29, 1911.

No Drawing. Original application filed August 20, 1910, Serial No. 578,226. Divided and this application filed April 19, 1911. Serial No. 622,032.

*To all whom it may concern:*

Be it known that I, FREDERICK W. FRERICHS, a citizen of the United States, residing at St. Louis, in the State of Missouri, have invented certain new and useful Improvements in Processes for Producing Calcium Pyrophosphate and Ammonia; and I do hereby declare the following to be a full, clear, and exact description of the invention, such as will enable others skilled in the art to which it appertains to make and use the same.

In the manufacture of fertilizer material, calcium phosphate is treated with sulfuric acid to produce a mixture of valuable calcium acid phosphate and gypsum which is an admixture of no value in conformity with:

*Formula "A."*

$$(PO_4)_2Ca_3 + 2H_2SO_4 = (PO_4H_2)_2Ca + 2CaSO_4$$

The reaction takes place by simply mixing the materials at ordinary temperature.

In the production of ammonia from ammonium sulfate and caustic lime, ammonia is liberated and the sulfuric acid combined with the lime to make gypsum which is valueless and goes to waste by:

*Formula "B."*

$$(NH_4)_2SO_4 + Ca(OH)_2 = 2NH_3 + CaSO_4 + 2H_2O$$

The reaction is carried out by mixing the materials with a large excess of water and distilling off the ammonia.

The present application is a division of application Serial No. 578,226, filed Aug. 20, 1910.

The process which forms the subject matter of this application combines the two reactions represented by Formulæ "A" and "B" producing from calcium phosphate and ammonium sulfate a mixture of calcium acid phosphate and gypsum the same as obtained in Formula "A" and free ammonia gas as obtained in Formula "B" theoretically by the following:

*Formula "C."*

$$(PO_4)_2Ca_3 + 2(NH_4)_2SO_4 = (PO_4H_2)_2Ca + 2CaSO_4 + 4NH_3$$

It is evident that in the reaction represented by Formula "C" the same result is obtained as in the two reactions represented by Formulæ "A" and "B" with the exception that all the sulfuric acid is saved which was wasted by reaction "A" and all the lime which was wasted by reaction "B." This saving is very large and makes the process very economical. Reaction "C" cannot, however, apparently be carried out in a direct way, but it can be accomplished by a combination of successive operations as follows: By roasting a mixture made in the proportion of one molecular weight calcium phosphate and one molecular weight ammonium sulfate to 250° C. ammonia commences to be liberated. By increasing the temperature gradually to 343° C. (650° F.) about one-half of the ammonia present in the mixture is set free and the second half of the ammonia can be liberated by gradually increasing the temperature to 500° C. While ammonia begins to be liberated at 250° C. it amounts to only a very small percentage and practically all the ammonia is liberated after the mass reaches a temperature above 343° C., a number of reactions taking place which may be represented by the following:

*Formula "D."*

$$(PO_4)_2Ca_3 + (NH_4)_2SO_4 =$$
$$(PO_4)_2Ca_3 + NH_4HSO_4 + NH_3 =$$
$$2PO_4HCa + CaSO_4 + 2NH_3 =$$
$$P_2O_7Ca_2 + CaSO_4 + 2NH_3 + H_2O$$

Calcium pyrophosphate and ammonia are obtained as resulting products of Formula "D," the first of which may be readily used for fertilizer material by treating it with sulfuric acid and water in accordance with:

*Formula "E."*

$$P_2O_7Ca_2 + CaSO_4 + H_2SO_4 + H_2O = (PO_4H_2)_2Ca + 2CaSO_4$$

It is not necessary to carry the reactions indicated by Formulæ "C" and "D" to completion since a small proportion of ammonium sulfate which may escape decomposition retains full value in the resulting fertilizer material. An excess of calcium phosphate or the application of a vacuum during the roasting process accelerates the reactions.

In Formulæ A, C and E water enters into the reaction to combine with acid phosphate calcium and sulfate calcium as water of crystallization. This water has been omitted in the formulæ to make them simpler and easier understood.

I claim:—

The herein described process consisting in roasting a mixture made in the proportion of one molecular weight calcium-phosphate and one molecular weight ammonium sulfate, gradually raising the temperature from normal to a temperature in excess of 650° F. until the major portion of the ammonia content has been liberated and the major portion of the calcium-phosphate has been converted into calcium pyrophosphate.

In testimony whereof I affix my signature in presence of two witnesses.

FREDERICK W. FRERICHS.

Witnesses:
L. L. MORRILL,
NANNIE MEEM.